APPARATUS FOR FORMING TUBULAR REINFORCED PLASTIC MEMBERS

Original Filed Nov. 14, 1963 9 Sheets-Sheet 1

INVENTORS
BRUNO B. SKOGGARD
WILLIAM C. POST
BY
McGregor & Eisenman
ATTORNEYS

APPARATUS FOR FORMING TUBULAR REINFORCED PLASTIC MEMBERS

Original Filed Nov. 14, 1963 9 Sheets-Sheet 2

INVENTORS
BRUNO B. SKOGGARD
WILLIAM C. POST
BY
McBregor & Eisenman
ATTORNEYS

APPARATUS FOR FORMING TUBULAR REINFORCED PLASTIC MEMBERS

Original Filed Nov. 14, 1963 9 Sheets-Sheet 5

INVENTORS
BRUNO B. SKOGGARD
WILLIAM C. POST
BY
McBryan & Eisenman
ATTORNEYS

APPARATUS FOR FORMING TUBULAR REINFORCED PLASTIC MEMBERS

Original Filed Nov. 14, 1963 9 Sheets-Sheet 4

INVENTORS
BRUNO B. SKOGGARD
WILLIAM C. POST
BY
M. Gregor & Eisenman
ATTORNEYS

APPARATUS FOR FORMING TUBULAR REINFORCED PLASTIC MEMBERS

Original Filed Nov. 14, 1963 9 Sheets-Sheet 5

INVENTORS
BRUNO B. SKOGGARD
WILLIAM C. POST
BY
McGregor & Eisenman
ATTORNEYS

APPARATUS FOR FORMING TUBULAR REINFORCED PLASTIC MEMBERS

Original Filed Nov. 14, 1963 9 Sheets-Sheet 6

INVENTORS
BRUNO B. SKOGGARD
WILLIAM C. POST
BY
McBregor & Eisenman
ATTORNEYS

APPARATUS FOR FORMING TUBULAR REINFORCED PLASTIC MEMBERS

Original Filed Nov. 14, 1963 9 Sheets-Sheet 7

INVENTORS
BRUNO B. SKOGGARD
WILLIAM C. POST
BY
McGregor & Eisenman
ATTORNEYS

APPARATUS FOR FORMING TUBULAR REINFORCED PLASTIC MEMBERS
Original Filed Nov. 14, 1963 9 Sheets-Sheet 8
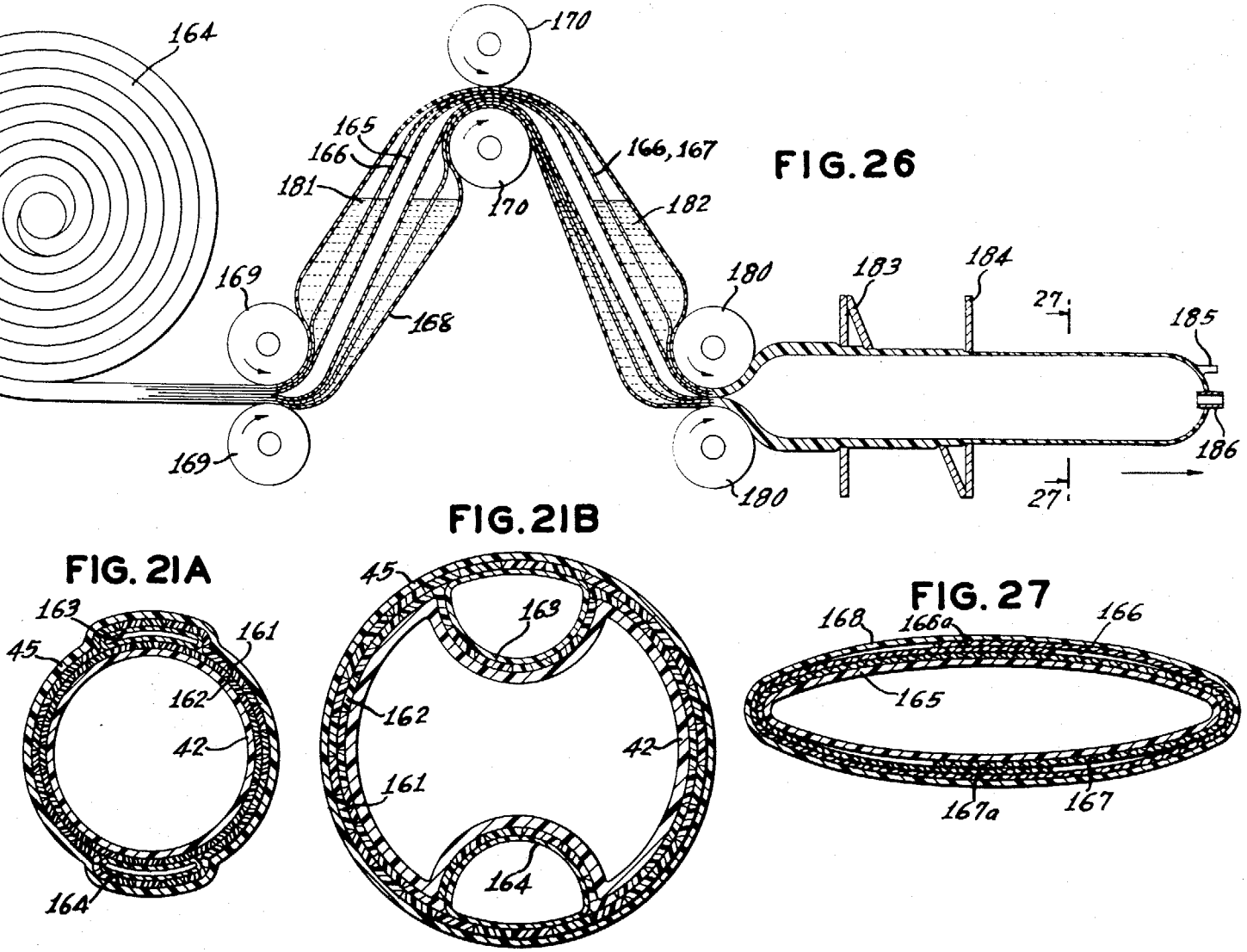
INVENTORS
BRUNO B. SKOGGARD
WILLIAM C. POST
BY
McGregor & Eisenman
ATTORNEYS

APPARATUS FOR FORMING TUBULAR REINFORCED PLASTIC MEMBERS

Original Filed Nov. 14, 1963 9 Sheets-Sheet 9

INVENTORS
BRUNO B. SKOGGARD
WILLIAM C. POST
BY
M. Gregor & Eisenman
ATTORNEYS

United States Patent Office

Re. 27,355
Reissued May 9, 1972

27,355

APPARATUS FOR FORMING TUBULAR REINFORCED PLASTIC MEMBERS

Bruno Bengt Skoggard, King City, Ontario, Canada, and William Clinton Post, Wallingford, Conn., assignors to American Cyanamid Company, Wayne, N.J.

Original No. 3,407,107, dated Oct. 22, 1968, Ser. No. 611,649, Jan. 25, 1967, which is a division of Ser. No. 323,763, Nov. 14, 1963. Application for reissue Apr. 14, 1970, Ser. No. 28,563
Int. Cl. B65h *81/00*
U.S. Cl. 156—432 18 Claims

Matter enclosed in heavy brackets [ ] appears in the original patent but forms no part of this reissue specification; matter printed in italics indicates the additions made by reissue.

ABSTRACT OF THE DISCLOSURE

An apparatus for forming continuous lengths of filamentary reinforced plastic pipe by means of a valve assembly which captures a non-moving slug of fluid under pressure over which an imperforate tubular flexible mandrel is continuously passed. Reinforcing filaments and hardenable plastic are applied continuously to the moving mandrel in its inflated condition by winding. Various winding patterns and layer configurations, including an outer wrap, are applied by means of guides and reels. Take-up rolls receive the wound pipe which, if not cured on the machine, is flattened after passing beyond the captured fluid slug. The pipe is then inflated and hardened in situ.

This application is a division of pending application Ser. No. 323,763, filed Nov. 14, 1963, now Pat. No. 3,329,173, which issued July 4, 1967.

The manufacture of filamentary reinforced plastic pipe, using helically wound reinforcing filaments, is typically carried out in finite lengths by winding plastic impregnated filaments on a polished mandrel and heating the assembly to cure or harden the plastic. The mandrel is then driven out of the finished pipe section. This is a time-consuming, costly process which becomes increasingly difficult to perform with increased pipe length. In addition, there is a tendency for wound filament plastic pipe to weep under cycling at high internal pressures.

Attempts have been made to produce such pipe in longer lengths as a continuous process by expedients such as sliding the pipe on the mandrel as it is cured or by collapsing the mandrels or by combinations of both. The cost of such apparatus is high and a certain degrading of the pipe quality often occurs which results in even greater weeping.

Also, storage and shipping costs for pipe are high due to high ratio of air space to solid material. In addition, the cost of installing pipe systems must reflect the time and skill required to make sound joints. Joints including special fittings plus the labor to assemble them often costs more than the pipe itself.

Accordingly, it is an object of the invention to provide new and improved apparatus for the fabrication of filament-reinforced plastic products.

It is another object of the invention to provide apparaus for the manufacture of tubular filament-reinforced plastic members such, for example, as pipe, conduit, beams and the like, which can be furnished, if desired, in extremely long joint-free lengths.

Another object of the invention is to provide improved apparatus for the fabrication of prestressed filament-reinforced plastic tubular products.

Still another object of the present invention is to provide new and improved apparatus for the manufacture of elongated tubular filament-reinforced plastic products, such as pipes, which are capable of accommodating liquids and gases under extremely high pressures without attendant weeping.

Still another object of the invention is to provide insulated tubular products and apparatus of fabricating them.

Still another object of the present invention is to provide new apparatus for the fabrication of hollow tubular members of filament-reinforced plastic in which the product can be manufactured in stages to facilitate shipment in flattened condition.

The above and other features and objects of the present invention, which involves apparatus, processes and products, will be apparent from the following description of preferred embodiments thereof having reference to the accompanying drawings in which:

FIGS. 21A and 21B are views in transverse section, the latter enlarged, showing a modification of the product formed in accordance with the present invention in which multiple conduits are formed in a single product;

FIG. 26 is a diagrammatic view in vertical section illustrating a modified process and apparatus for fabricating hollow tubular members; and FIG. 27 is a view in transverse section taken on the line 27—27 of FIG. 26 in enlarged scale and showing the wall structure of the hollow tubular member of plastic-reinforced filaments prior to curing.

Figure 1:
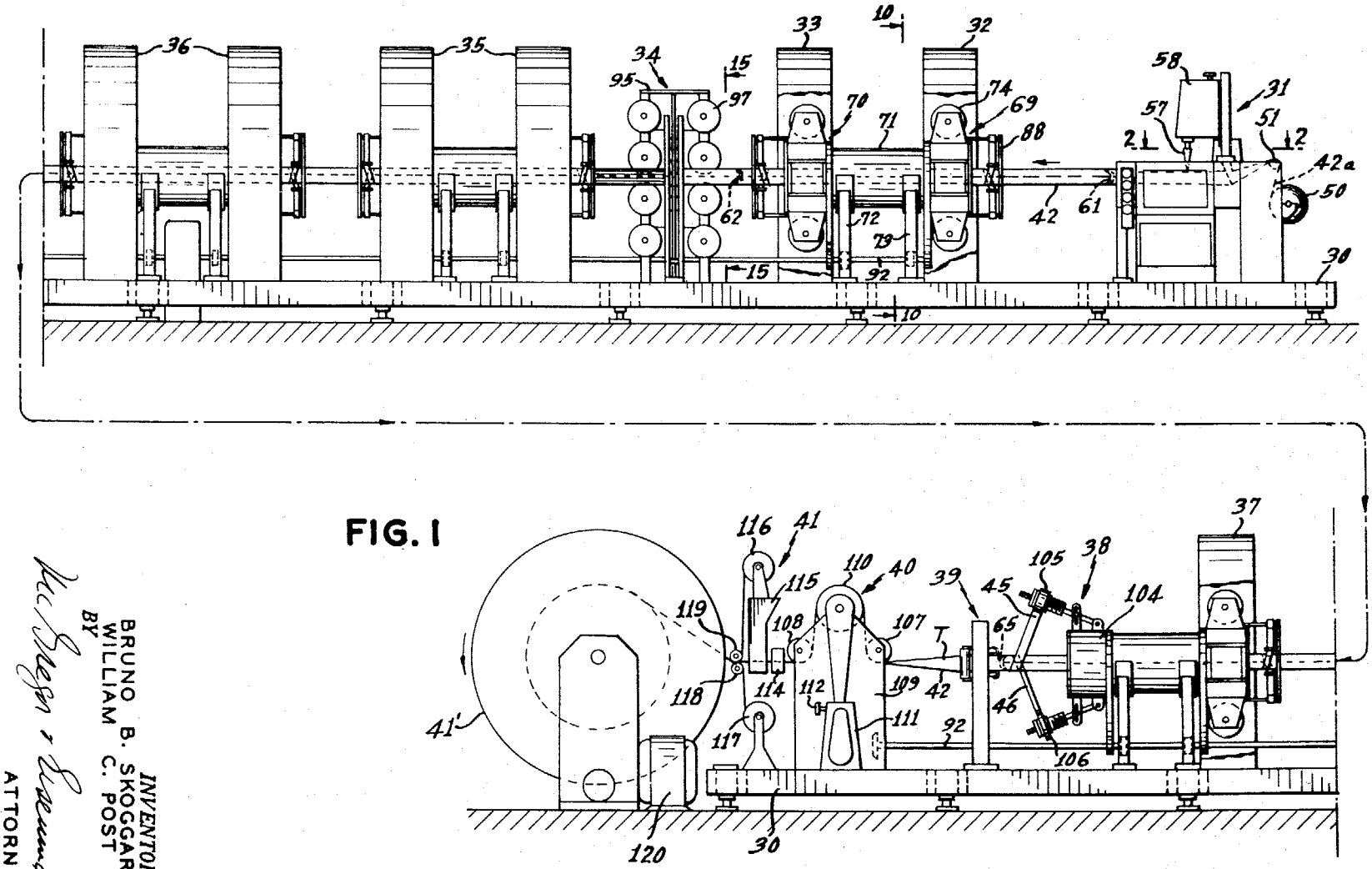
FIG. 1 is a view in side elevation of apparatus formed in accordance with the present invention for carrying out certain of the processes and for fabricating certain of the products of the invention.

Referring to the drawings, first having reference to FIG. 1, and related FIGS. 2 through 16, there is shown an apparatus formed in accordance with the present invention an apparatus formed in accordance with the present invention for fabricating filamentary-reinforced plastic products. These products can take the form of hollow tubular members of great length such as the pipe shown in FIGS. 17, 18A and 18B, or other cross sectional configurations such as the hollow web I-beam of FIG. 19 or the nonwoven sheet material of FIG. 20. In the arrangement illustrated in FIG. 1, the product which is wound on the takeup spool or storage reel at the output end of the machine is in the form of a flattened tubular member the walls of which are formed of filamentary reinforcing material such as fiber glass impregnated with settable plastic such as polyester resin, epoxy resin or the like. The product is, therefore, flexible and can be flattened to conserve space as well as to afford numerous other features and advantages which will be apparent from the following description and disclosure. The product is thus adapted to be cured at a later time in the desired, ultimate configuration by hardening the plastic by means presently to be described. It will be apparent, therefore, that the present invention envisions apparatus, processes and products involving the fabrication and curing of filamentary-reinforced plastic material.

The apparatus of FIGS. 1–16 represents one preferred embodiment of the invention for fabricating the products up to but not including curing into a rigid form, and for carrying out a portion of the processes of the invention. To this end the apparatus comprises a frame or bed 30 supporting, beginning at the right-hand end of the upper portion of the figure, a tube-forming and pnuematic mandrel-control console station 31, a first pair of spindle or winding stations 32 and 33 for applying helical windings, in opposite modes, of filamentary reinforcing material preferably impregnated with settable plastic; and a station 34 for applying longitudinally or lengthwise-disposed reinforcing filaments. Following the longitudinal filament station 34 are a series of spindle pairs 35 and 36, each of which applies a pair of oppositely wound helical pairs of plastic impregnated reinforcing filaments, and (moving now to the right-hand side of the lower portion of FIG. 1) a single spindle station 37 for applying helical windings followed by a station 38 for applying an outer wrap to the product. A guide 39 is disposed beyond the outer wrap station 38 followed by a tube feeding and flattening station 40, an insulation applicator station 41 and a driven takeup reel 41'.

Figure 17:
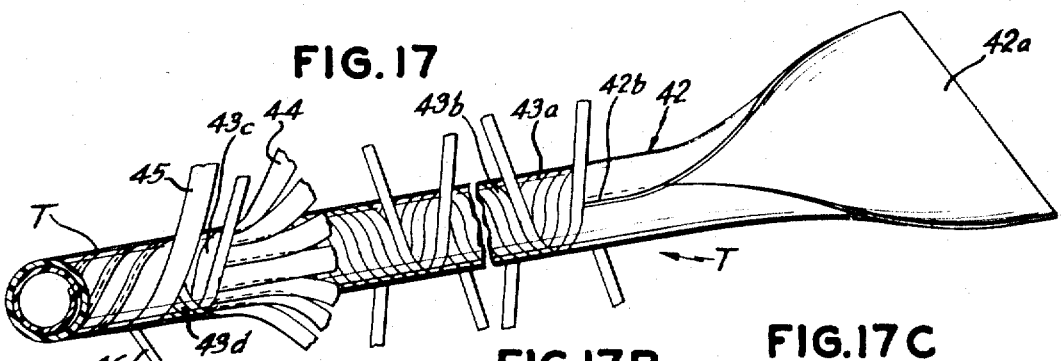
FIG. 17 is a view in perspective and partially exploded showing the component parts of a section of a hollow tubular member or pipe formed in accordance with the present invention.

Broadly speaking, the function of the apparatus of FIG. 1 is to fabricate a flexible tubular product T which can be comprised, as best seen in FIG. 17, of a flexible, imperforate inner liner 42 having reinforcing filaments and settable plastic disposed thereabout in a series of helical courses 43a, 43b, 43c and 43d. The helically wound courses can take the form, for example, of continuous filaments of fiber glass impregnated with settable plastic such as epoxy resin, polyester resin or the like. The number of courses of helical windings can be varied according to the design criteria of the finished product, the apparatus illustrated in FIG. 1 being capable of applying up to seven such courses by virtue of seven spindle stations. Interspersed among the helical courses is a layer of longitudinally disposed reinforcing filaments 44, also impregnated with settable plastic and applied by the station 34. In the illustrated product the longitudinal reinforced filaments are disposed between the helical courses 43b and 43c, although it will be understood that they can be disposed at other points in the lamination and that additional longitudinal layers can be provided. The product is completed by an outer wrap or sleeve, applied by the station 38, which comprises a band or strip of sheet plastic 45 snugly wound about the outer course of reinforcing filaments and plastic and secured by an adhesive sealing strip 46 helically wound over the abutting edges of the wound band 45.

The reinforcing filaments 43 and 44, the inner liner 42 and the outer wrap or sleeve 45 are preferably so arranged that when high fluid pressures are applied internally radial pressure is built up across the reinforcing filaments and plastic. The radial pressure can be derived by various combinations of characteristics. In one preferred arrangement the inner liner 42 is formed of a relatively nonresilient plastic film such, for example, as a water-repellent film of polyethylene terephthalate, and the outer wrap 45 of heat-shrinkable plastic such, for example, as an oriented polyester film so that when fluid pressures are applied internally and heat is applied the outer wrap will pull tightly against the internally generated pressure to compress the plastic and reinforcing filaments, after which the plastic cures or hardens so that the finished product will have dense walls in which the reinforcing filaments are prestressed lengthwise as well as compressed radially across the wall thickness. Compression of the walls radially can also be achieved by providing a relatively resilient inner liner 42 capable of expanding under certain conditions against a relatively less resilient outer wrap. Radial compression can also be achieved by controlling the tension of the outer wrap relative to the helical windings of reinforcing filaments.

Figure 18A:
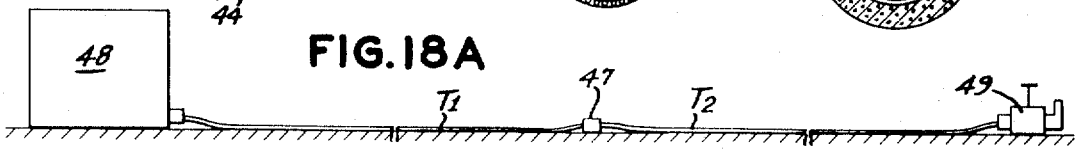
FIGS. 18A and 18B are diagrammatic views in side elevation showing the inflation and curing of pipe in situ.
Figure 18B:
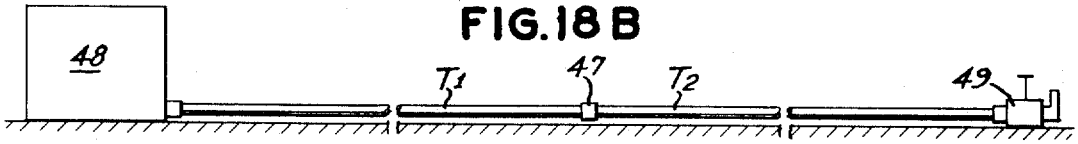

FIGS. 18A and 18B illustrate a typical procedure for forming the flattened tubular product which appears on the reel 41' of FIG. 1 into cured or hardened pipe. To this end, the flattend flexible tubular product T is carried to its ultimate site in flattened rolls. If desired, successive sections T–1 and T–2 can be joined by suitable coupling fittings 47 and one end coupled to a heat and pressure source such, for example, as a steam generator 48 and coupling the other end to a metering or bleed valve 49. When steam under pressure is injected into the tubular parts T–1 and T–2, the tube inflates into a pipe under the influence of steam pressure, the reinforcing filaments are prestressed and the pipe walls are compressed radially.

The pressure and heat are controlled by both the source 48 and the metering valve 49. Depending on the nature of the settable plastic used, the plastic hardens or cures and the finished pipe can then be used for its intended ultimate purpose such, for example, as a water or gas main, an electrical conduit or the like. It will be understood that successive sections can be cured and joined together with the total length of pipe which is cured at any one time being dependent upon the nature of the plastic and the amount of heat and pressure available from the source 48 in relation to ambient conditions. It will be understood further that other sources of heat and internal pressure can be used in curing the pipe such, for example, as pneumatic or hydraulic pressure, either of which can be combined with supplemental heat sources such as radiant heating ovens or dielectric heating units through which the pipe can be passed or which can be passed over the pipe. As will be described below, the basic design of the tubular product can take various other cross sectional configurations.

Figure 2:
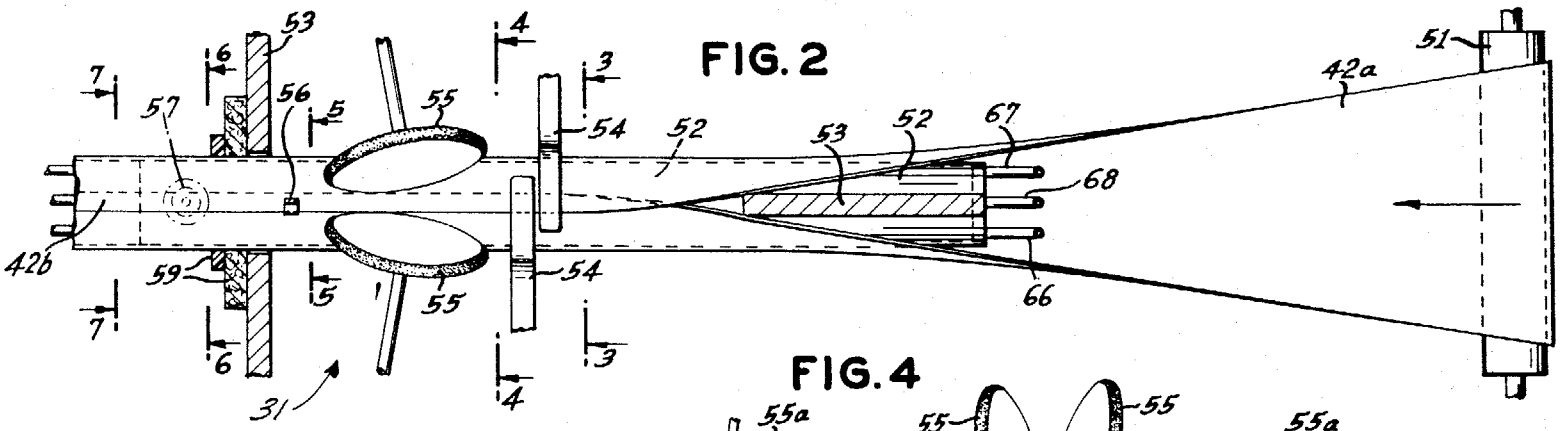
FIG. 2 is a fragmentary view in horizontal section taken on the line 2—2 of FIG. 1, looking in the direction of the arrows.
Figure 4:
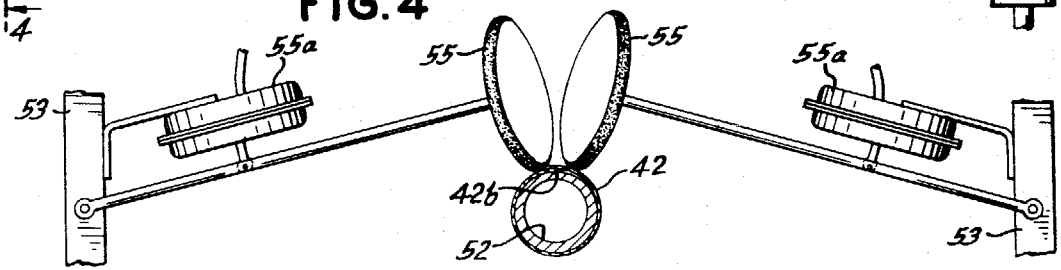
FIG. 4 is a view in transverse section taken on the line 4—4 of FIG. 2, looking in the direction of the arrows.
Figure 3:
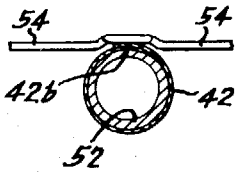
FIG. 3 is a view in vertical section taken on the line 3—3 of FIG. 2, looking in the direction of the arrows.
Figure 5:
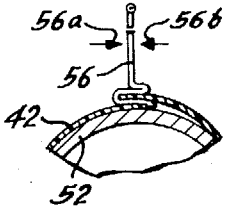
FIG. 5 is a view in transverse section taken on the line 5—5 of FIG. 2, looking in the direction of the arrows.
Figure 6:
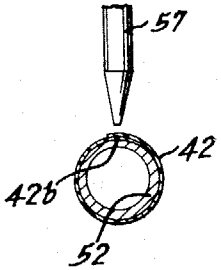
FIG 6 is a view in transverse section taken on the line 6—6 of FIG. 2, looking in the direction of the arrows.
Figure 7:
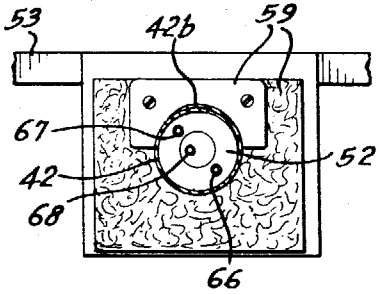
FIG. 7 is a view in transverse section taken on the line 7—7 of FIG. 2, looking in the direction of the arrows.

Referring again to FIG. 1, the tubular product T is formed as part of a continuous process beginning with the inner liner 42 and concluding with the outer wrap or sleeve 45. In the illustrated arrangement, as best seen in FIG. 2, the inner liner 42 is formed on the machine from a flat strip 42a of imperforate plastic sheet material supplied from a source reel 50, passed over an idler roller 51 and formed into a circular tube over a guide mandrel (FIG. 2) supported by a beam 53 and overlapped to form a longitudinal seam 42b. Fixed guides or presser fingers 54 (FIG. 3) and canted guide wheels 55 of variably adjustable pressure (FIG. 4) pilot the sheet material into the desired tubular configuration and at a point just beyond the adjustable guide wheels 55 the seam 42b in the plastic sheet is sensed by a pivot finger 56. The finger 56 swings between contacts 56a and 56b (FIG. 5) which actuate pressure members 55a and 55b to effect a corrective force on the folded plastic sheet in a corrective force on the folded plastic sheet in a closed servo loop. The piloted, folded sheet passes beneath an anvil of a plastic welding machine which can take the form of an ultrasonic welder 57. The anvil reacts against the mandrel 52, which finds additional support at its free end in a guide 59 (FIG. 7) formed of low-friction material such as tetrafluoroethylene, which allows the formed tube to slide between the guide 59 and the internal mandrel 52.

Figure 8:
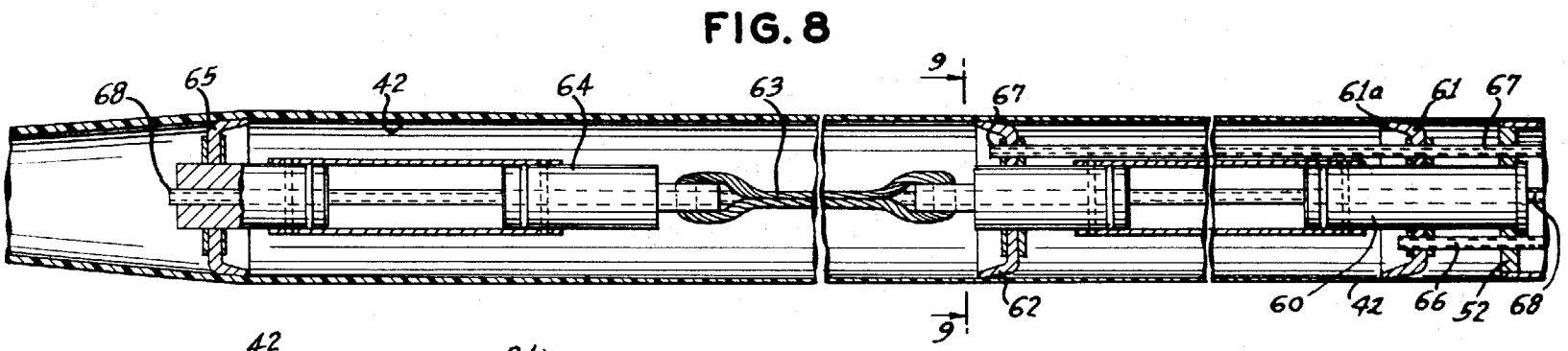
FIG. 8 is a fragmentary view in enlarged scale and foreshortened longitudinally of the pneumatic valve and conduit assembly which is part of the apparatus of FIG. 1.

Beyond the sealing or welding station 31 the tubular liner 42 passes over a series of valve stations, best seen in FIG. 8. Secured to the mandrel 52 at the console station 31 is a tension member which can take the form of a metal tube 60 having a blocking member in the form of a circular valve or sealing ring 61 mounted thereon. The sealing ring or blocking member 61 includes a flexible lip 61a facing the direction of tube travel and which presses radially outwardly against the liner 42. At the remote end of the tension member 60 in the direction of travel of the liner 42 is mounted a second forwardly facing sealing member 62 similar to the blocking member 61. Attached to the end of the tension member 60 is a second tension member 63 coupled at its remote end, in the direction of travel of the liner 42, to a tubular tension member 64 carrying a sealing member 65 at its far end and facing rearwardly.

Referring to FIG. 1, it will be seen that the fist blocking member 61 is disposed closely adjacent the control console 31 and that the third member 65 is disposed just beyond the wrap station 38. The intermediate member 62 is disposed between the spindle or winding station 33 and the longitudinal filament stations 34. The three blocking members 61, 62, and 65 define two pressure chambers along the length of the tubular liner 42 which carry fluid pressures which form the tube into a rigid mandrel as it passes through the apparatus. To this end, a first pneumatic conduit 66 pierces the first blocking member 61 and opens into the chamber between the members 61 and 62.

A second pneumatic conduit 67 pierces both members 61 and 62 and opens into the space between the members 62 and 65, and a third conduit 68 pierces all three members and opens into the space beyond the member 65. The first conduit 66 introduces a first fluid pressure into the flexible tubular liner 42. The second conduit 67 introduces a relatively higher pressure into the same liner beyond the member 62 and the third conduit 68 is a relief tube for leakage fluid which might escape beyond the member 65. All of these pneumatic tubes are controlled at the console station 31 by pressure regulating valves (not shown) and the pressures are arranged to provide maximum firmness of the tube as it passes through the machine within the limits or tolerances of the materials.

It will be understood that the application of helical wraps by the spindle stations 32 and 33 to the tubular liner enable it to withstand higher internal pressures. The action of the relief tube 68 is to maintain a slight positive pressure in the tube beyond the sealing member 65 so that the tube 42 can slide over the member without binding. The pressure is adjusted so that minimum leakage occurs across the valve consistent with binding forces which would impede the sliding motion.

The inflated tubular liner 42, between the sealing members 61 and 65, affords a pneumatic mandrel against which filament-applying operations such as winding are carried out. The slugs of fluid under pressure contained within the mandrel are held stationary by the members which are in turn anchored to the frame of the machine so that the tubular sleeve or liner 42 can move relatively thereto. Thus the liner 42 moves continuously while at the same time forming a structural element of a mandrel. If desired, a lubricating and supplementary sealing film can be applied to the inside of the tubular liner 42 to facilitate slipping over the sealing member and to seal against air leaks.

It will be understood that the tension of the tubular liner 42 in the apparatus coupled with the internal pressures contribute to an overall beam effect which holds the mandrel in a fixed lateral position while forward, axial motion obtains, although supplemental supports can be furnished throughout the length of the apparatus in the form, for example, of rollers and guides, as necessary to prevent lateral movement. Internally disposed rollers and sliders can be furnished to react against external rollers or slides to secure the mandrels and to react against the winding forces.

Figure 10:
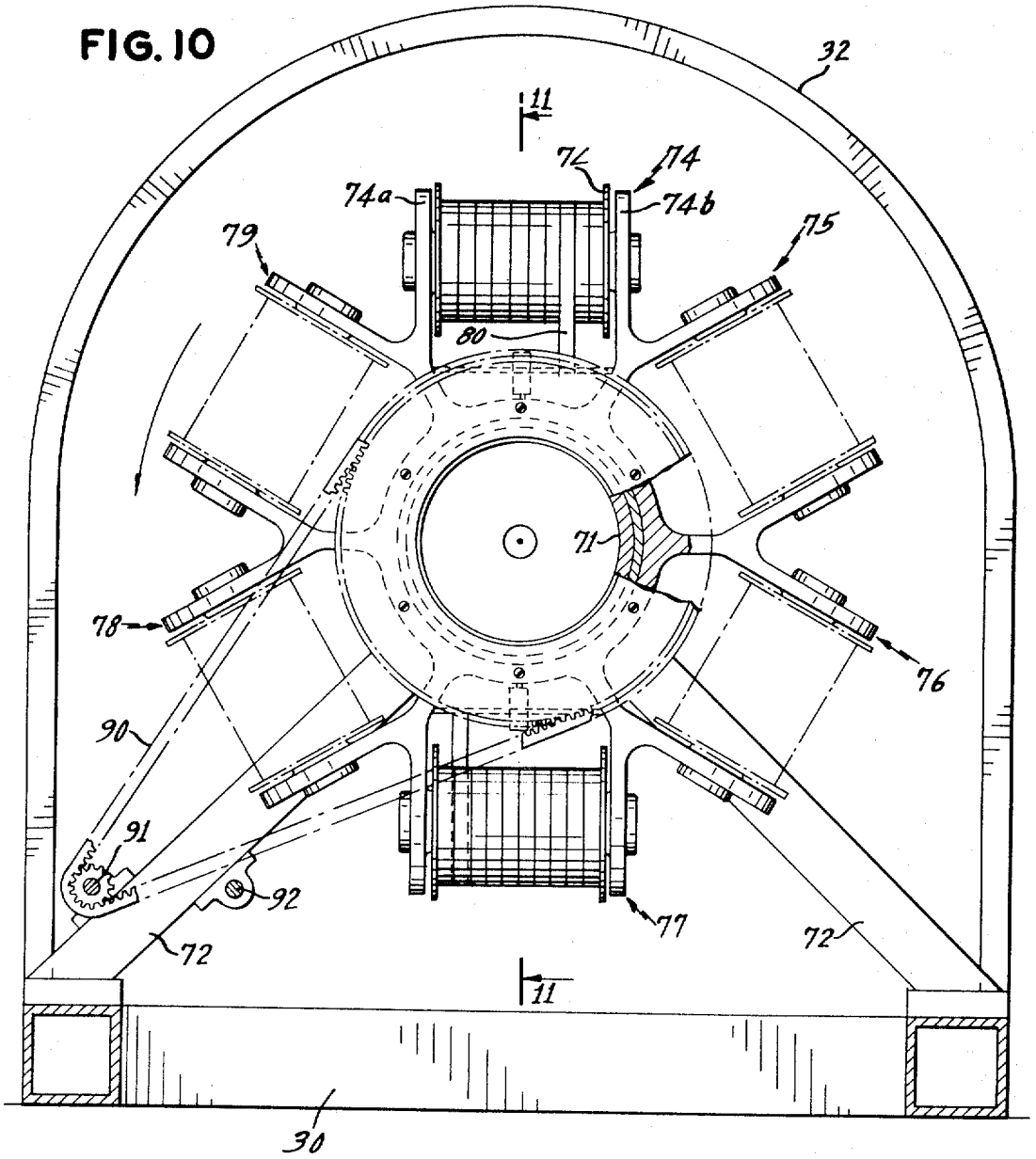
FIG. 10 is a view in enlarged scale and in transverse section of one spindle section of the apparatus of FIG. 1, taken on the line 10—10 thereof, looking in the direction of the arrows.
Figure 11:
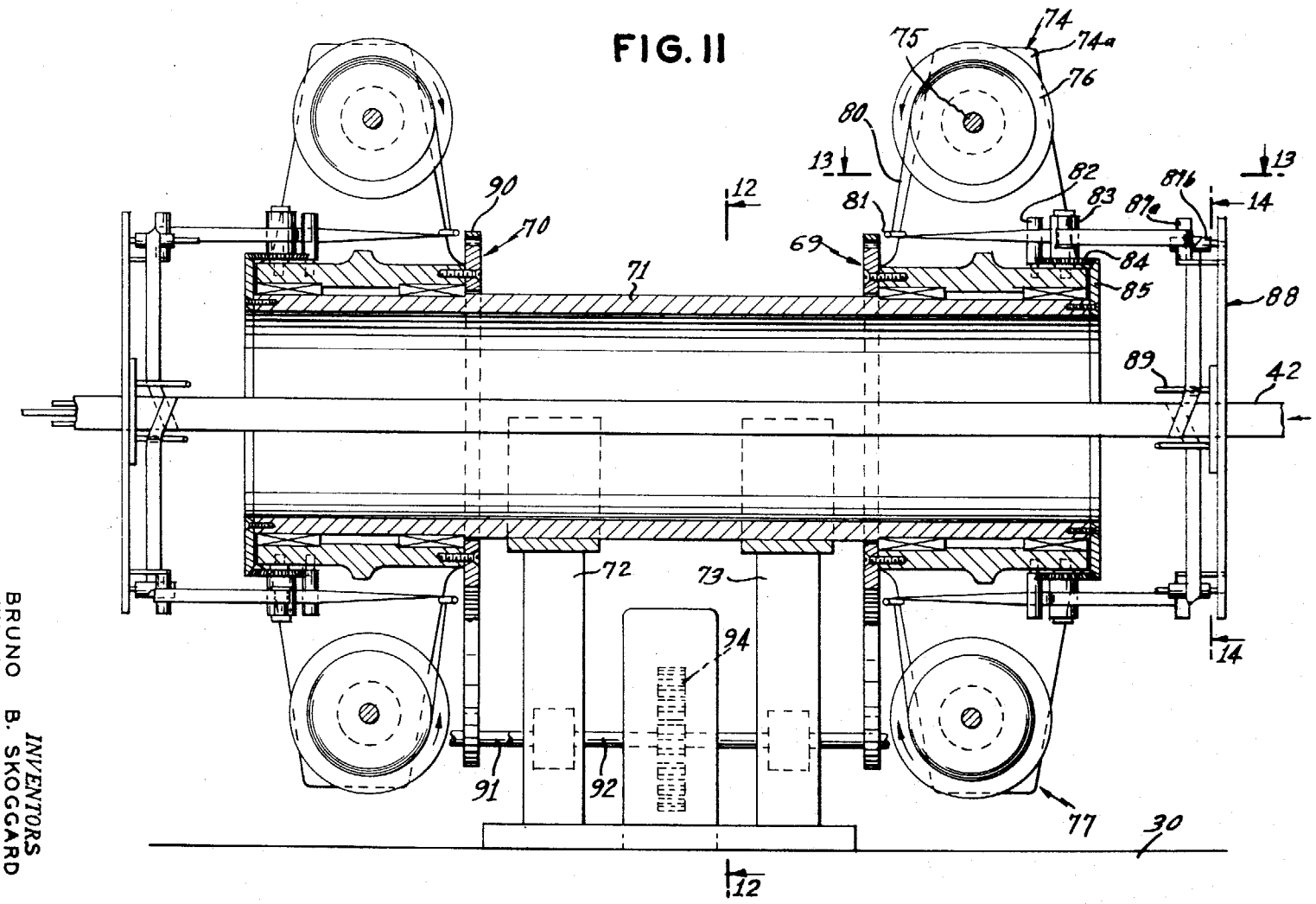
FIG. 11 is a view in vertical section taken on the line 11—11 of FIG. 10, looking in the direction of the arrows.

Referring to FIGS. 10 and 11, the details of a typical reinforcing filament-applying station are disclosed. The apparatus of FIG. 1 is designed particularly to apply reinforcing filaments in the form of fiber glass tape impregnated with settable plastic. To this end the filament-applying stations comprise rotary spindles 69 and 70 (FIG. 11) both mounted on a common bearing 71 supported on the frame of the apparatus by pedestals 72 and 73. The two rotary spindles 69 and 70 are identical with the exception of the direction of rotation. Each spindle includes a plurality of bobbin or spool supports 74, 75, 76, 77, 78 and 79, and each support comprises a pair of end plates such as the plates 74a and 74b (seen in FIG. 10) carrying an axle or shaft 75, on which is rotatably mounted a bobbin or spool 76 containing plastic-impregnated reinforcing filaments such as non-woven tape. Frictional drag or resistance can be built into the rotary support to control the unwinding tension of the tape.

Figure 13:
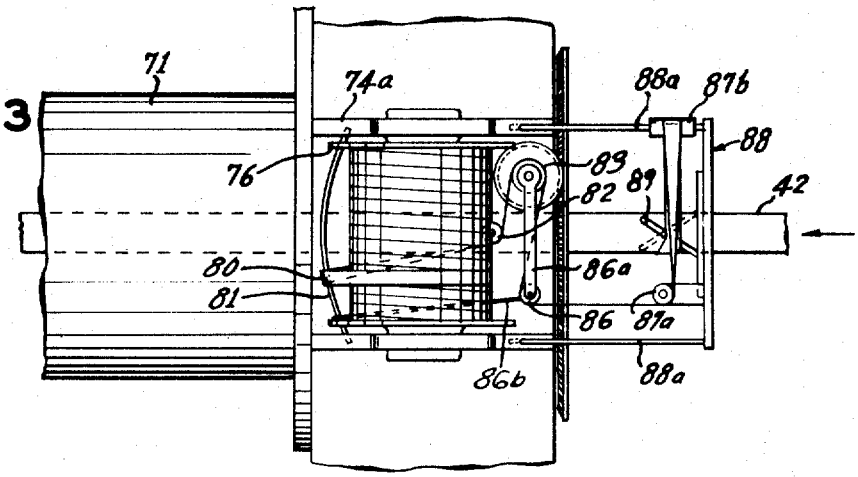
FIG. 13 is a view in horizonal section through the upper portion of one of the spindles of FIG. 11, taken on the line 13—13 thereof, looking in the direction of the arrows.
Figure 12:
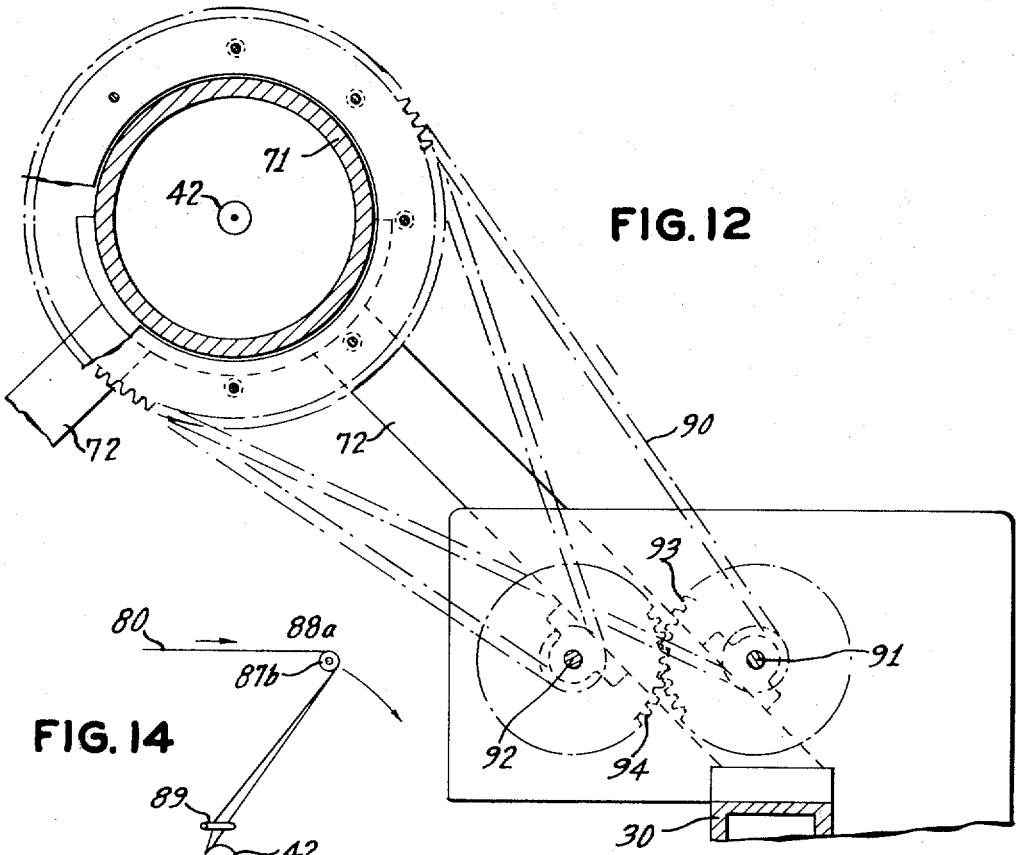
FIG. 12 is a view in transverse section taken on the line 12—12 of FIG. 11, looking in the direction of the arrows and showing a drive mechanism for adjacent spindles.
Figure 14:
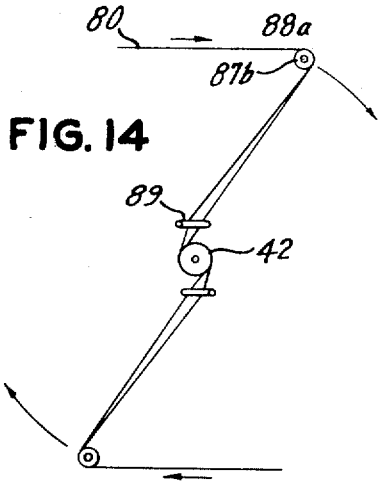
FIG. 14 is a view in transverse section taken on the line 14—14 of FIG. 11, looking in the direction of the arrows and showing the application of filamentary material to the mandrel.

In each case, the tape, as best seen in FIGS. 11 and 13 viewed together, passes from the spool 76 over a curved guide bar 81 extending generally parallel to the axis of the spool, over a guide roller 82, and around a variable speed drive and tension-regulating assembly 83. The latter is driven by a bevel gear 84 rotatably mounted in the spindle casting 69 and engaging a stationary ring gear 85 secured to the fixed bearing member 71. It will be understood that the ring gear 85 is common to all of the tensioning members for each of the spindles.

Passing from the variable, tape-feeding and tensioning assembly 83, the tape engages a guide roller 86 rotatably mounted at the free end of a swinging arm 86a held by a resilient member 86b (FIG. 13), such as an elastic strip or spring secured at its other end to a fixed frame part which actuates the variable feeding and tensioning assembly 83. The operation of the arm 86a is such that as the tension changes on the tape passing around the roller 86, the diameter of the drive spool in the assembly 83 is increased or decreased as required to control the rate of feed of the tapes and to maintain the proper tension thereon. The tape passes from the guide roller 86 to a pair of guide rollers 87a and 87b on mutually perpendicular axes and carried by a frame 88 which rotates with the spindle and is attached thereto by support arms 88a. From the guide roller 87b the tape passes over an inclined bar 89 (best seen in FIGS. 11 and 14) and on to the tubular liner 42. It will be recalled that the tubular liner 42 moves axially but does not rotate. The tape frame 88, together with the spindle 69, rotates and, depending upon the adjustable rate of axial travel of the liner 42, applies a helical winding of tape thereto at a desired pitch angle. The spindle 69 can be used to wind one, two or up to six tapes in the same hand or direction on the tubular mandrel or liner 42.

The spindle 69 is driven by suitable chain or cog belt 90 from a shaft 91 secured to the frame of the machine and extending lengthwise thereof. The shaft 91 is coupled to and drives the corresponding spindle of each pair at each of the successive winding stations in the same direction. The second or trailing spindle of each pair (including the spindle 70 of FIG. 11) is driven by a shaft 92, also journaled in the frame 30 and extending the length of the machine. The shafts 91 and 92 are coupled by gears 93 and 94 (FIG. 12) to rotate in opposite directions and are driven from a prime mover (not shown). Each spindle is linked, as stated, to its related drive shaft by a chain or cog belt so that absolute synchronism obtains throughout the machine.

It will be understood that the number of spindle stations used and the number of tapes of reinforcing filaments wound on from any given spindle is dictated by the ultimate wall thickness and strength characteristics desired in the final product. It will also be understood that the various diameters for the tubular mandrel or liner 42 can be accommodated without changing the basic apparatus and that the upper limit of mandrel size is determined by the inside diameter of the bearing 71.

Figure 16:
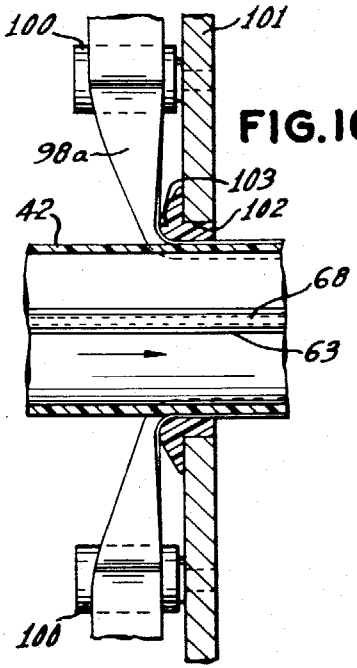
FIG. 16 is a fragmentary view in enlarged scale taken on the line 16—16 of FIG. 15, looking in the direction of the arrows and showing the application of longitudinal filamentary reinforcing filaments to the mandrel.
Figure 15:
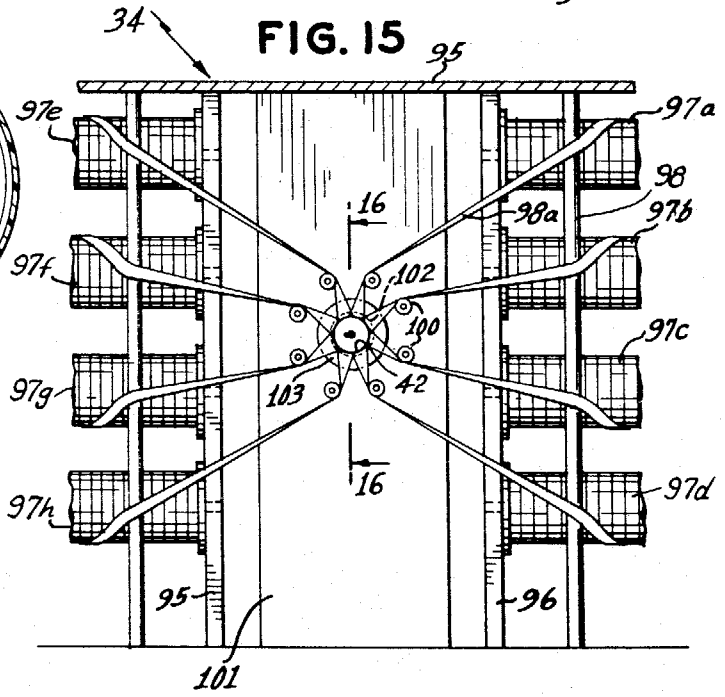
FIG. 15 is a view in transverse section taken on the line 15—15 of FIG. 1 through the mandrel of the machine and showing the application of longitudinal filamentary reinforcing filaments thereto.
Figure 9:
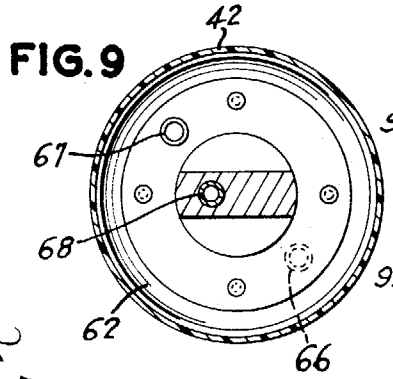
FIG. 9 is a view in transverse section taken on the line 9—9 of FIG. 8, looking in the direction of the arrows.

In the case of many products, particularly filament-reinforced pipe, it is desirable to include longitudinally arranged filaments in addition to helically wound filaments and to this end the filament-applying station 34 is provided. This station, as best seen in FIGS. 15 and 16, includes a pair of racks 95 and 96 carrying spools or bobbins, 97a, 97b, 97c, . . . 97h of reinforcing filaments which can take the form of non-woven tape impregnated with settable plastic. One preferred reinforcing filamentary material is fiber glass and the filaments are preferably arranged in the tape as continuous multifilaments disposed side by side without interweaving or crossing. The number of longitudinally applied tapes can be varied to suit specific needs and in the illustrated arrangement eight tapes are applied in edgewise abutting relationship with the width of each tape occupying one-eighth of the circumference of the tube to complete the wrap circumferentially. The tape 98a from each of the spools is passed around a guide bar 98 and over guide rollers 100, rotatably mounted in a support plate 101 formed with a circular aperture 102 to receive the moving liner or mandrel 42. A contoured, annular plastic ring 103 is mounted in the aperture 102 to guide the tapes on to the mandrel.

Referring to FIG. 1, immediately after the longitudinal filaments are applied at the station 34 a helical winding station is provided which, by the application of helically wound filaments secures the longitudinal filaments in place. Longitudinal reinforcing filaments can be applied at various points throughout the machine in such numbers and of such character as the finished product might demand.

The station 38 for applying the outer wrap or sleeve includes a rotary sleeve 104 which carries a roll of wrapping tape 105 which can take the form, for example, of a transparent plastic sheet material supported at an angle corresponding to the angle at which the tape is to be wound on the tube or mandrel. The butted edge joint of the helically wound outer wrap 45 is sealed by a tape 46 carrying an adhesive. The sealing tape 46 is also carried by the rotary sleeve 104 at an angle corresponding exactly to the angle of wrap of the tape 45. The outer wrap 45 and sealing tape 46 are preferably applied under tension and are formed of materials which are capable of constraining the tubular product T when it is inflated under high pressure, as described above in conjunction with FIGS. 18A and 18B. In the event constraining forces are not required, the station 38 can be used to apply expendable protective wrap. It will also be understood that additional external wraps or envelopes can be applied as required by the design characteristics of the finished product.

Passing from the station 38 through the guide 39, the tubular product T passes into a feeding and flattening station 40, which includes a pair of idler rollers 107 and 108 rotatably journaled in a frame 109 on which is mounted a feed roller 110 driven by a chain or timer belt coupled to the shaft 92 through a gear box 111 including a variable speed drive adjusted by a manual control 112. By varying the speed, both the tension and the rate of travel of the product through the machine are controlled.

Figure 17A:
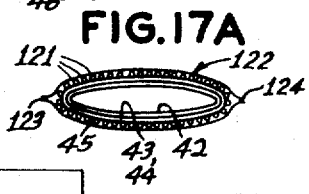
FIGS. 17A, 17B and 17C are views in transverse cross section of a pipe in three successive stages of formation into the final product.
Figure 17B:
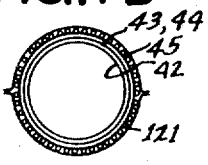
Figure 17C:
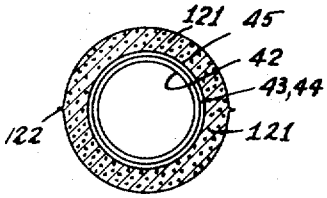

Beyond the feeding and flattening station 40 is the insulating station 41 which applies foamable plastic to the tubular product if it is desired to incorporate an insulating layer such as is shown in the pipe of FIGS. 17A, 17B and 17C. The station 41 includes an adhesive applicator 114 for applying a thin layer of adhesive to the outer surface of the product, followed by a hopper or magazine 115 which contains granules of foamable plastic. Such materials are commercially available in either thermoplastic or thermosetting types and are well known in the plastic arts. A typical foamable thermoplastic is described in U.S. Pat. No. 2,256,483, and a typical foamable thermosetting plastic is described in U.S. Pat. No. 2,642,403. The flattened tube T passing through the hopper of loosely packed granules picks up a uniform layer. Upon emerging from the hopper 115 the product, including its layer of foamable plastic granules, is enveloped in a sheath 122 formed by a pair of strips of sheet plastic fed from storage rollers 116 and 117, the strips being sealed together at their edges by suitable heat-sealing rollers 118 and 119, at either edge of the flattened product. As will be described more fully below in conjunction with FIGS. 17A, 17B and 17C, the outer sleeve or wrap is relatively loosely applied and is formed of a highly heat-shrinkable material such, for example, as oriented polyethylene or polypropylene sheet material treated and conditioned to shrink radically under the influence of heat. The finished flattened tubular product is then wound on the reel 41' driven by a suitable drive motor 120 through a slip clutch to compensate for the changing diameter as convolutions are added.

It will be understood that while the apparatus of FIG. 1 has been illustrated utilizing pre-impregnated filamentary tapes as the reinforcing members, reinforcing filaments in the form of individual filaments, multifilaments, woven strips or yarns can also be wound onto the supporting liner or mandrel. Such reinforcing materials can be pre-impregnated with plastic or, alternatively, the plastic can be added at the time the yarns are spun onto the liner or the plastic can be added later, for example, just prior to curing into the finished product. Likewise, the parallel-filament, nonwoven tapes 80 need not necessarily be impregnated with plastic prior to being wound on the spools 76. In such case, liquid plastic can be applied to the filaments as they are wound onto the mandrel, using suitable continuously replenishable reservoirs on the spindle.

Referring to FIGS. 17A, 17B and 17C, there is shown in cross section an insulated pipe or conduit formed in accordance with the invention, in three successive stages of formation beginning at the point the product is taken from the reel 41'. It will be understood that this product is the same as that of FIG. 17 with the addition of an insulating layer. FIG. 17A illustrates the flattened tubular product or pipe which includes a layer of foamable plastic imparted at the station 41 of the apparatus of FIG. 1. This flattened section includes the inner imperforate tubular member 42, layers of helically wound filaments 43, 44 taking the form of fiber glass filaments impregnated with settable plastic, a layer of longitudinal filaments 44, an outer wrap comprised of helically wound strips of sheet plastic 45, a layer of foamable plastic 121 and an external sheath or envelope of sheet plastic 122, the latter comprising the strip-sheets from storage rollers 116 and 117, joined together at their edges by longitudinal seams 123 and 124. If desired, the helical wrap 45 can be omitted and the foamable plastic applied directly to one of the layers of plastic-impregnated reinforcing filaments. FIG. 17B shows the tubular product of FIG. 17A inflated under high fluid pressure, preferably corresponding to the ultimate working pressure of the finished pipe, thereby prestressing the reinforcing filaments and also causing, in certain cases, the reinforcing filaments to be compressed radially between the inner liner 42 and the outer wrap 45. It will be observed that the external envelope 122 is at this stage of manufacture relatively loose and that the foamable plastic has not been activated.

Referring to FIG. 17C, the settable plastic in the layers 43 and 44 has been cured as by the application of heat and the foamable plastic layer 121 has been activated or foamed, while at the same time the envelope 122 has been shrunk to afford radial compression against the foamed plastic, thereby forming a relatively thick insulation layer of foam plastic of cylindrical configuration and intimately bonded to the reinforced walls enveloped thereby. The outer envelope can either be bonded to the external surface of the foamed plastic or, having served its purpose of establishing a circular configuration it can be removed if desired. The entire inflatable tube assembly with a foamable plastic layer added can be inserted in an existing pipe or conduit, such as a leaky gas or water main, and thereafter inflated and cured to cause the foamable plastic to center and secure the then hardening plastic pipe within the existing pipe. The outer envelope in such case can be formed of low temperature thermoplastic sheet material.

The imperforate inner liner 42 is preferably initimately bonded to the contiguous hardened wall of plastic-impregnated reinforcing filaments to render the inner surface smooth for low friction flow and to present a surface impervious to high-pressure leaks, or weeping, under operating pressures, and further, to seal the fluid which might flow in the finished pipe from possible contaminating effects of random detached lengths of reinforcing filaments. The liner 42 should, therefore, be formed of a material compatible with the ultimate use of the pipe and capable of bonding to the impregnated plastic, either directly or by the use of supplemental adhesives. It will be understood, however, that the inner tubular liner 42 can for certain purposes be removed, in which case it should be selected of a material which will not bond to the plastic which impregnates the reinforcing filaments.

The relatively thick wall of foamed plastic imparts strength as well as insulating properties to the pipe, and the latter can be augmented by the use of one or more layers of metallic foil incorporated in the wall. Metallic grids or screens can also be incorporated at any point in the lamination construction for shielding or other electrical effects. The foamed plastic or other suitable filler material can also be used between two layers of plastic-impregnated reinforcing filaments to impart a circular beam effect rendering the pipe highly resistant to compression, as well as imparting insulation.

Figure 20:
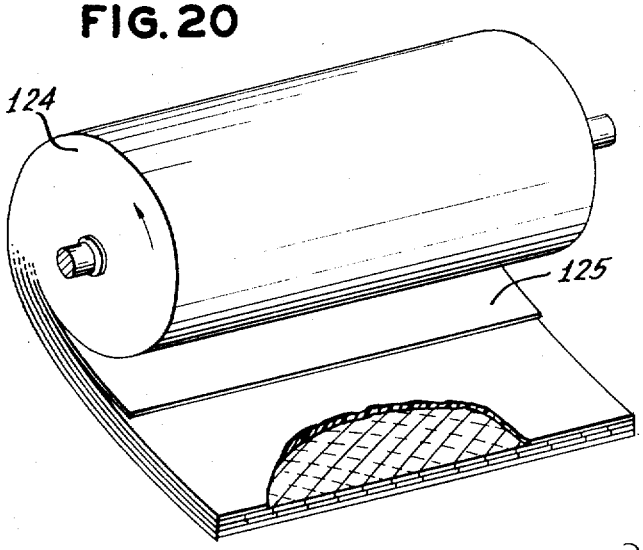
FIG. 20 is a view in persepective and partly broken away, showing a reel of nonwoven, plastic-impregnated filamentary reinforced material as it appears before curing the hardening of the plastic.

If it is desired to provide a nonwoven fabric of oriented reinforcing filaments impregnated with plastic, the tubular product can be slit longitudinally before curing and stored in a roll or bolt 124, as best seen in FIG. 20. In such case, it is preferred that the fabric be rolled up with an expendable spacer sheet 125. In the fabric of FIG. 20, it will be observed that longitudinal reinforcing filaments have been omitted, although such can be included if desired. It will also be understood that the crossed filaments can be disposed at any desired angle, although an angle of 90° is preferred for most purposes. Also, by appropriate application of the helical windings, using the machine of FIG. 1, the tapes or filaments which comprise the nonwoven fabric can be spaced apart to form a basketweave configuration for special decorative effects. For its ultimate use, the plastic-impregnated, nonwoven fabric of FIG. 20 is typically formed by the consumer into the desired geometry, using dies and molds if desired, after which it is hardened by heating to cure the plastic.

Figure 19:
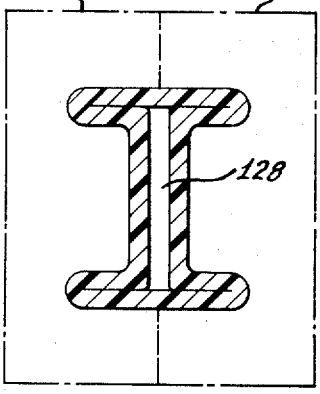
FIG. 19 is a view in transverse cross section of a reinforced tubular member contained between die elements and formed thereby to an I-beam configuration.
Figure 22:
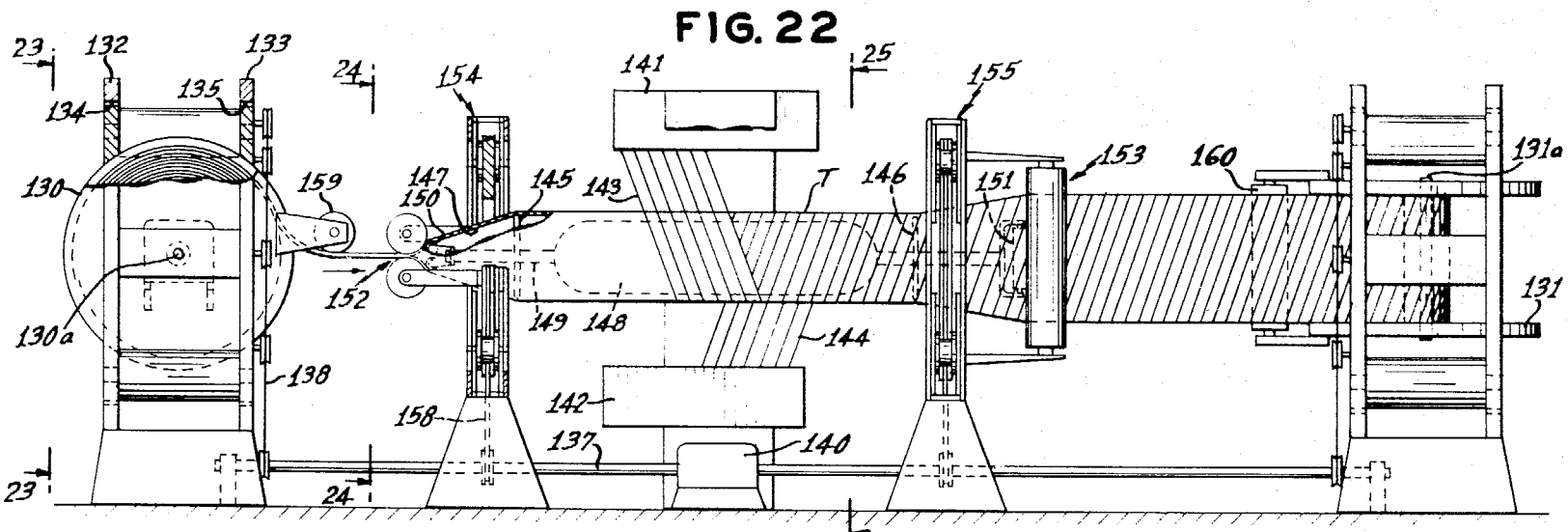
FIG. 22 is a view in side elevation partly broken away in vertical section showing a modification of the apparatus of FIG. 1.

It is also possible, in accordance with the present invention, to form the tubular product as it emerges from the apparatus of FIG. 1 into out-of-round configurations by the use of supplemental dies. Referring to FIG. 19, for example, there is illustrated an I-beam configuration formed by curing the tubular product between two female forming dies 126 and 127 while applying a high fluid pressure internally in the space 128. The resulting product is an I-beam having a hollow or double-wall web. As in the case of circular cross-section pipe, the out-of-round configuration can be formed either at a later time in a separate curing operation or it can be incorporated in the basic forming operation by curing the product in the desired shape continuously as it is formed in its soft or flexible form, on the machine of FIG. 1, for example. It will be understood that to inflate and cure the product as it emerges from the machine of FIG. 1, the takeup reel 41' is omitted. The leading end of the tube is sealed as by clamping. Pressure can be introduced either at the clamped end or from the forming end, as shown. A source of heat, such as steam, an oven, or a dielectric heater, can be provided or self-curing plastic can be used. Provision should be made to guide and accommodate the continuously generated length of finished pipe.

It will be understood that the apparatus, processes and products of the present invention can take various other and more intricate forms and arrangements. Thus, referring to FIGS. 21A and 21B, there is illustrated a tubular pipe in which there has been introduced between the adjacent layers of helically wound, plastic-impregnated reinforcing filaments 161 and 162, a pair of longitudinally disposed flexible, imperforate tubes 163 and 164. An inner liner 42 and an outer wrap 45 are provided as previously described. FIG. 21A shows such product as it would appear on the apparatus of FIG. 1 prior to being flattened for temporary storage. FIG. 21B shows such product under internal fluid pressure at the time of curing, in which fluid pressure has also been introduced into the supplemental tubular members 163 and 164. When cured in this configuration, a multiple-channel pipe results which is also rendered more rigid by virtue of its unique internal structure. If desired, the tubular member 163 can be wound helically at either steep or gentle angles within the pipe by applying the tubing by means of a separately controlled rotary spindle rather than applied in the manner of a longitudinal reinforcement from a station, such as the feed station 34. By winding one or more supplemental tubes in a helical configuration and providing a relatively thin reinforcing wall between the supplemental tube and the internal liner 42, a heat exchanger can be fabricated in which turbulent flow is encouraged. Rigidity is also imparted to the structure. Other forms, configurations and uses will suggest themselves to those skilled in the art.

Figure 23:
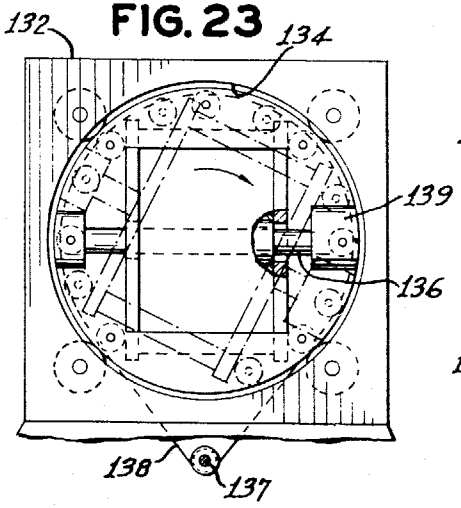
FIG. 23 is a view in vertical section taken on the line 23—23 of FIG. 22, looking in the direction of the arrow.

Referring to FIGS. 22 through 25, there is shown a modification of the basic apparatus for forming flexible, flattened, filament- reinforced plastic pipe capable of being shaped and cured. This apparatus forms the same basic pipe structure as that of FIG. 1 but differs in several basic respects. There are provided a pair of reels 130 and 131 at opposite ends of the machine, both of which constitute both takeup and supply reels. The reel 130 is rotatable about an axle 130a, and the reel 131 about an axle 131a. The rotatable reels are in turn rotatably mounted in frame assemblies of identical construction which enable the reels to be rotated about a common longitudinal axis through the machine which also intersects the axles 130a and 131a. As best seen in FIG. 23, rotary frames comprise external supporting plates 132 and 133, having internal annular tracks 134 and 135, in which is mounted a carriage 136 carrying the reel. A drive shaft 137 and a chain or link belt 138 drives the carriage and its array of supporting wheels. Rotation of each reel about its own axle is accomplished by drive motors 139 energized through slip rings (not shown). Thus, the reels are able to partake of two concomitant rotary motions about mutually perpendicular axes. The tubular product T, beginning with a flexible imperforate inner liner or mandrel 147, passes back and forth between the two reels 130 and 131, as will be described below.

Figure 25:
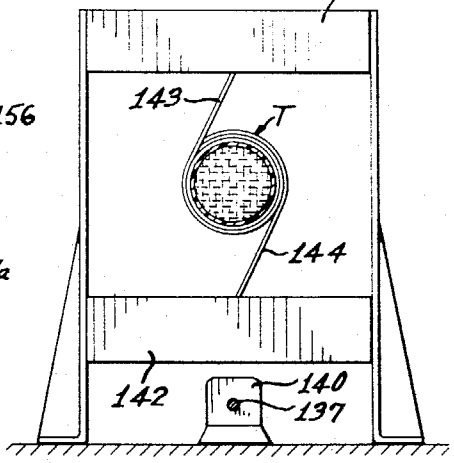
FIG. 25 is a view in transverse section taken on the line 25—25 of FIG. 22, looking in the direction of the arrows.
Figure 24:
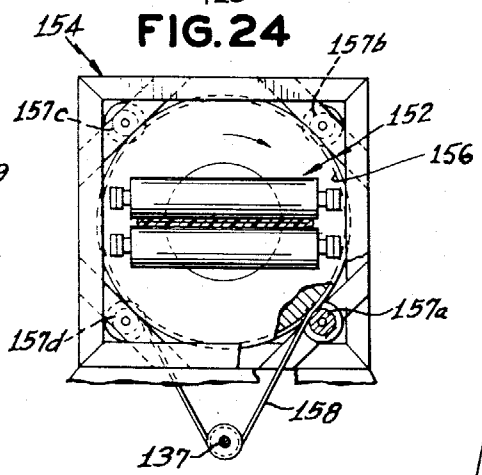
FIG. 24 is a view in vertical section taken on the line 24—24 of FIG. 22, looking in the direction of the arrows.

Disposed between the two reels and their rotary frames, both of which are driven from the common shaft 137 by a drive motor 140, are source of reinforcing filaments and settable plastic 141 and 142. The reinforcing filaments 143 from the source 141 engage the tubular liner 147 on one side and the reinforcing filaments 144 from the source 142 from the other side, as seen in FIG. 25. The filaments 143 and 144 are disposed at angles so that as the tubular liner rotates, oppositely wound helixes of reinforcing filaments will be applied. As the tubular liner is passed back and forth between the two reels 130 and 131, first in one direction and then in the other, any desired number of layers of helically wound filaments can be applied. Longitudinal filaments can be applied from the same sources by running the tubular product back and forth between the reels without rotation about the axis of the tubular product. By stressing the inner liner tightly between the reels 130 and 131, the reinforcing filaments can be wound directly thereon in either helical or longitudinal mode, or both. An outer wrap can be similarly applied from a fixed source of sheet material corresponding to the source 105 of FIG. 1, but not shown in FIG. 22, and sealing tape 46 can be applied as desired. Thus, a product is produced which corresponds to the product produced by the apparatus of FIG. 1.

For a more precise control of the tubular product, however, a pneumatic mandrel can be provided in the form of a pair of sealing elements or blocking members 145 and 146 captured within the imperforate tubular liner 147. Between the valve elements 145 and 146 the tubular liner 147 is inflated under fluid pressure to form a rigid, circular mandrel. A captured mass of fluid under pressure can be maintained for a long interval with efficient sealing elements. However, a regulated fluid pressure source 148 can be provided within the mandrel to meter out fluid to replenish leakage and to maintain the desired mandrel firmness. The two sealing elements 145 and 146 are joined by a compression member 149, which can include the fluid-pressure source 148, and opposite ends of the compression member 149 carry roller assemblies 150 and 151 which react against paired roller assemblies 152 and 153, respectively, through the wall of the tubular liner 147. The latter rollers also compress and flatten the tubular liner and any reinforcing filaments which might be disposed thereon.

The roller assemblies 152 and 153, and hence the rollers 150 and 151 within the tubular liner, are all adapted to be rotated as one with the liner. To this end, the paired rollers 152 are carried by a rotary housing 154 (FIG. 24) and the roller assembly 153 by a rotary housing 155, which is a duplicate of the assembly 154. The rollers 152 are supported in a carriage 156 which rotates in an annular track defined by a wheel array 157a, 157b, 157c and 157d, and the carriage is driven by a chain or belt drive 158 from the shaft 137. The housings 154 and 155 are able to accept axial thrust from the sealing element assembly within the tubular member by referencing such thrust to the frame of the machine.

The system is set up by providing a roll of flattened, imperforate tubular material on one of the reels and stringing it across to the other through the rotary roller assemblies 152 and 153. Guide rollers 159 and 160 on the reel assemblies assist in positioning the tube. The tubular liner 147, which can take the form of extruded plastic, or of seamed sheet plastic, is then inflated between the sealing elements 145 and 146. This can be done by piercing the wall of the liner outside the element 145 and applying a source of fluid pressure to a valve fitting (not shown) in the sealing element. The hole in the tubular liner is thereafter sealed. Alternatively, the internal pressure source 148 can be activated through the wall of the tubular liner. The tubular liner is then run back and forth between the reels and at the same time rotated to take on layers of reinforcing elements in the desired configurations. An outer wrap is applied and such additional layers as might be required for forming a foamed plastic layer, all as described above.

It will be understood that the sources 141 and 142 of reinforcing filaments can take a wide variety of forms and can be readily interchanged during operation of the machine. Also, the settable plastic can be applied to the filaments at the source so that the reinforcing yarns can be stored dry or free of plastic until the approximate moment they are wound on the mandrel. Moreover, the configurations or patterns of reinforcing filaments applied to the mandrel can be many different spacings and angles, and different materials can be incorporated as layers at any point in the total lamination. The machine, because rotary spindles are not used, is particularly adapted to fabricate large diameter pipe or other tubular products.

Referring now to FIGS. 26 and 27, another modification of product, apparatus and method of the present invention is disclosed. There is wound on a storage or supply reel 164 a flattened tube assembly which is preformed but which does not include settable plastic. The inner tubular liner 165 and the outer wrap 168 can take the form of continuous extruded plastic tubes of thin-walled plastic, although it will be understood that these tubes can also be formed by sealing plastic sheet strips in the manner described above in conjunction with FIG. 1 and the tube forming station 31. Reinforcing filaments are disposed in layers between the tubular members and in the illustrated arrangement, these inner layers taking the form of overlapped, woven fiber glass roving or nonwoven fabric of the type shown in FIG. 20. A first layer 166 is overlapped at 166a and a second layer 167 is overlapped at 167a, although multiple convolutions of a single piece of fabric can be used. These sandwich assemblies can be fabricated in a variety of ways, including techniques previously described, or they can be assembled manually in reasonably long lengths by inserting successive layers one within the other. The prepared sandwich construction is fed through a series of pairs of restricting and feeding rollers 169, 170 and 180, with the roller assembly 170 being offset vertically.

A reservoir of liquid plastic 181 is pumped into the space between the inner and outer layers of plastic tubing 165 and 168 between the restricting rollers 169 and 170. The liquid plastic is injected by piercing the outer tubing 168 which is thereafter sealed to render it airtight. A second reservoir of liquid plastic 182 is established in the space between the inner and outer layers of plastic tubing 165 and 168 between the restricting and feed rollers 170 and 180. The material in the reservoir 182 can be identical to that in the reservoir 181 or, alternatively, it can take the form of an activator for the plastic in the reservoir of 181 which initiates the curing of the plastic at room temperature, for example.

In the event the product is not to be cured until a later time, settable plastic is used in both reservoirs and the apparatus is activated by driving the roller pairs 169, 170 and 180 and rolling up the finished product in a flattened, uncured state similar to that on the reel 41' of FIG. 1. In the event it is desired to form and cure the pipe as part of a continuous operation, the free end of the tube or pipe T is sealed at its leading end and connected to a fluid pressure source through a fitting or valve 186 which inflates the tube beyond the driven rollers 180 in the direction of travel. In FIG. 26 the end closure is illustrated in schematic fashion. In a working system an end closure fitting with appropriate clamps and valves is used. Such end closure can also be used with the apparatus of FIG. 1 if it is desired to cure the pipe as part of a continuous process. The rollers 180 form a restriction which precludes the passage of the inflating fluid. This seal is augmented by the pressure of the standing column of liquid in the reservoir 182.

Annular squeegees 183 and 184 work out entrapped air bubbles and masses of plastic which might form, in which connection a linear distance between the squeegees and the roller pair 180 is selected so that accumulated air and surplus plastic can be accommodated in quantities which might be developed for the entire run of tubing from the reel 164.

The squeegees 183 and 184 can also be used when the inflated length of finished pipe is not cured as part of a continuous process. In such case, inflation is used in combination with the squeegees to achieve uniform distribution of the liquid plastic and the finished tube is subsequently flattened and stored, as on the reel 41' of FIG. 1. In such case, it is sometimes desirable to vent the space between the outer and inner layers 165 and 168 by means of a venting valve 185.

If, however, the pipe is to be cured as part of a continuous forming process, additional heat can be applied as necessary. To this end, steam can be inserted through the fitting 186 or, alternatively, suitable heat sources such as an oven or a dielectric heater (not shown) can be provided. It will be understood that the free end of the pipe, and therefore the inflating fluid source, is movably supported so that it can travel as the length of pipe is generated or, alternatively, the reel 164 and the driven rollers 169, 170 and 180 can be part of a carriage or transport which moves forward as the pipe is generated. The valve or fitting 186, in such case, is stationary.

A two-inch (internal diameter) pipe formed in accordance with the invention included an inner liner of two mil polyester film 6⅝ inches wide formed and sealed ultrasonically into an imperforate tube having a two-inch I.D.; two one-inch wide epoxy resin-impregnated fiber glass filament tapes wound on the liner at a 16° pitch helix; seven one-inch tapes of the same material disposed along the tube side by side to form a longitudinal course or ply; two one-inch wide tapes of epoxy resin-impregnated fiber glass filament tapes wound on a helix of the same pitch as the first but in the opposite direction; and an outer wrap formed of a web of polyester film wound on helically and sealed with a pressure-sensitive adhesive or contact tape over the seam. A 450 ft. length of this tubing was cured using steam at 105 p.s.i. input and 80 p.s.i. outlet or exhaust. After curing, the steam was replaced with air to hold the inner liner against the lamination until the structure cooled.

While the invention has been described above in various forms and arrangements, it will be understood that certain variations can be made which will be apparent to those skilled in the art. Thus, for example, a wide range of laminar wall structures can be built in the finished product, including fluid-tight layers, highstress layers, reflecting layers, insulating layers, shielding layers, identification layers, dielectric layers and the like, depending on the ultimate uses of the finished product and the means by which it is to be cured. With respect to the apparatus, it will be understood that various incidental operations, such as printing of the sheet plastic or the inclusion of decorative color strips can be effected while the basic product is being formed. Also, supplemental feed rollers can be provided along the length of the pipe, if necessary, to overcome cumulative frictional forces and, if desried in the arrangement of FIG. 1, independent sealing elements can be provided along the length of the tube which need not be referenced back to the control station 31 by tension members but which can be referenced directly to the frame by means of gripping rollers reacting against an internal wheeled carriage to which the sealing element is secured. Also, the total tension in the system can be controlled by supplemental feed rollers and by frictional controls on the supply reel at the station 31. With respect to the finished product, it will be understood that the inner liner or mandrel 42 can take the form of a multi-layered sheet in which the outer layer is thermoplastic and the inner layer is thermosetting, the former to augment the bond between the liner and the plastic which impregnates the reinforcing filaments. Also, while for most purposes it may be preferred to use continuous filaments as the reinforcing members, a layer of randomly oriented short filaments and fillers in a carrier vehicle of settable plastic can be applied, as by spray or immersion techniques. Such layers are best cured within an enveloping, control layer of sheet material. The invention should not, therefore, be regarded as limited except as defined in the following claims.

We claim:

1. Apparatus for making reinforced plastic articles comprising a source of inflatable flexible tubing, and means to support an inflated section of the tubing, a pair of spaced apart blocking means adapted to engage the tubing at two points spaced lengthwise thereof and to contain fluid in the tubing under pressure between the points, means to establish relative motion between the blocking means and the tubing to cause the contained fluid under pressure and the tubing to be moved relative to each other in the direction of the axis of the supported section of tubing, and means to apply reinforcing filaments and settable plastic to the tubing between the said points.

2. Apparatus as set forth in claim 1, said means to apply reinforcing filaments to the tubing including means to wind continuous reinforcing filaments helically on said tubing between said points.

3. Apparatus as set forth in claim 2, including means to apply reinforcing filaments to the tubing longitudinally and circumferentially.

4. Apparatus as set forth in claim 1, said source of flexible tubing comprising means to carry a supply of sheet material in flat, strip form, guide means to form the strip into a tube, and sealing means to form a longitudinal seam forming the inflatable tubing.

5. Apparatus as set forth in claim 4, including fluid conduit means connected to the space within the tubing section between the blocking means, said conduit means passing through said guide means.

6. Apparatus as set forth in claim 5, said conduit means including a portion extending through both of said blocking means to exhaust fluid from the tubing beyond the section of the tubing under fluid pressure.

7. Apparatus as set forth in claim 1, including means to apply a flexible outer sleeve to said tubing to envelop the settable plastic and reinforcing filaments.

8. Apparatus as set forth in claim 7, said means to apply an outer sleeve to the tubing comprising a source of flexible strip material, and means to wind the strip material helically on the tube.

9. Apparatus as set forth in claim 1, said means to maintain fluid under pressure in a section of said tubing comprising a pair of spaced apart sealing elements disposed within the tube in slidable engagement therewith, said means to establish relative movement between the sealing elements and the tubing including feed means to move the tubing axially, and holding means to maintain the sealing means in relatively fixed axial positions within the tubing as it is moved through the apparatus.

10. Apparatus as set forth in claim 9, including third sealing means disposed within the tubing spaced axially from said pair of sealing means, whereby different fluid pressures may be maintained within the tubing in different sections thereof.

11. Apparatus as set forth in claim 10, including first winding means to wind continuous reinforcing filaments helically on said tubing in one of the sections as defined by said sealing means, and second winding means to wind additional continuous reinforcing filaments on said tubing overlying the first wound filaments and applied in the second section defined by said sealing means, said first and second winding means each including independently adjustable tension-controlling means, whereby different tensions can be applied to the filaments wound by the respective winding means.

12. Apparatus as set forth in claim 11, including a source of continuous reinforcing filaments to apply filaments to the tubing longitudinally thereof in advance of one of the winding means in the direction of movement of the tubing.

13. Apparatus as set forth in claim 1, including means to flatten the tubing after application of said reinforcing filaments and settable plastic, thereby to form a flexible flat tube affording a blank for subsequent forming and setting by hardening said settable plastic.

14. Apparatus as set forth in claim 1, including means to flatten the tubing after the application of the settable plastic and filaments, fluid pressure means to reinflate the flattened tube, and means to set the settable plastic to form a rigid tubular product.

15. Apparatus as set forth in claim 1, including a pair of reversible rolls disposed respectively at opposite ends of the blocking means to serve selectively as source and takeup rolls, and means to pass the inflatable tubing back and forth between the rolls to receive successive layers of reinforcing filaments.

16. Apparatus as set forth in claim 15, including means to rotate the rolls about an axis coincident with the axis of the tubing between the rolls while the tubing is passing between the rolls, said means to apply reinforcing filaments comprising a source adjacent said tubing, whereby the reinforcing filaments are drawn onto the tubing in left and right hand helixes for opposite directions of axial travel of the tubing.

17. Apparatus as set forth in claim 16, including means to secure said blocking means against movement axially with the tubing, and means to supply fluid pressure between the said points of said blocking means whereby a mass of fluid under pressure is maintained in an axially fixed position as the tubing is passed back and forth thereover.

*18. An apparatus for producing reinforced pipes, comprising in combination a device for moving a plastic tubular film, a closing means for locally closing the moving tubular film and a means located past said closing means for applying alternate layers of helically wound resin-impregnated reinforcing threads and axially oriented resin-impregnated reinforcing threads when the tubular film is supported by a filling gaseous medium, a fixedly mounted piston connected to an air-supply pipe and provided with a bore in communication with the air-supply pipe supplying air from this pipe into the tube, over which piston and air-supply pipe the pipe formed by the tube and the coating is able to pass during production.*

References Cited

The following references, cited by the Examiner, are of record in the patented file of this patent or the original patent.

UNITED STATES PATENTS

| | | | |
|---|---|---|---|
| 2,758,366 | 8/1956 | Voetelink | 156—432 X |
| 3,250,654 | 5/1966 | Rubenstein | 156—285 X |

FOREIGN PATENTS

| | | |
|---|---|---|
| 866,309 | 4/1961 | Great Britain. |
| 1,180,376 | 12/1958 | France. |

BENJAMIN A. BORCHELT, Primary Examiner

G. E. MONTONE, Assistant Examiner

U.S. Cl. X.R.

156—156, 443, 446